Feb. 18, 1941.  J. A. ORR  2,232,261

GRASS CUTTER AND TRIMMER

Filed Aug. 25, 1938  2 Sheets-Sheet 1

Inventor
John Alexander Orr
By H. J. Sanders
Atty.

Feb. 18, 1941. J. A. ORR 2,232,261
GRASS CUTTER AND TRIMMER
Filed Aug. 25, 1938  2 Sheets-Sheet 2
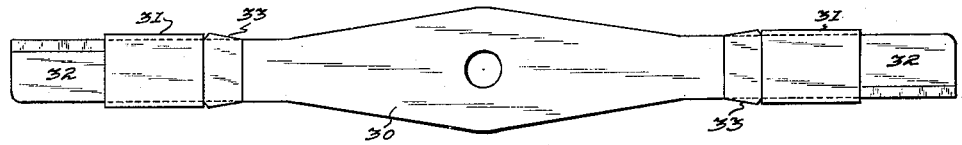
Fig. 7.
Fig. 8.
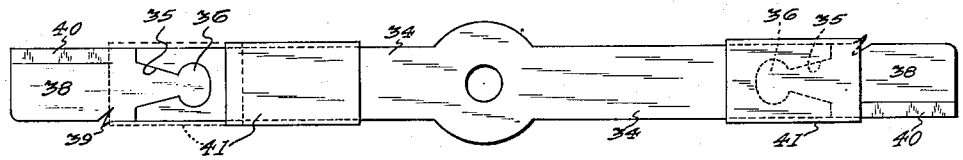
Fig. 9.
Fig. 10.
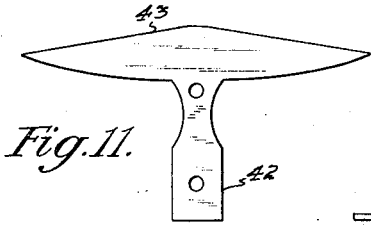
Fig. 11.
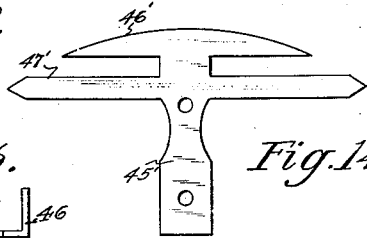
Fig. 13. Fig. 14.
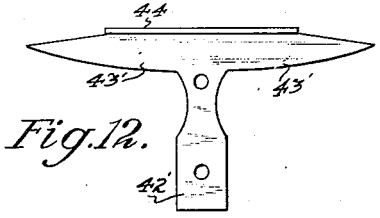
Fig. 12.
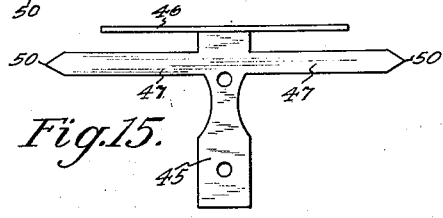
Fig. 15.
Fig. 16.
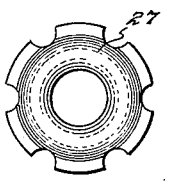
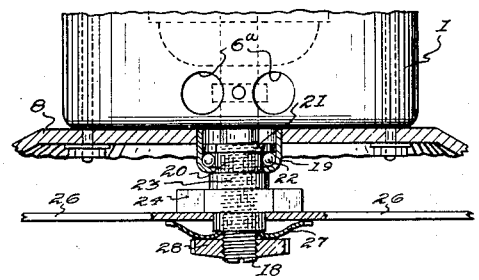
Fig. 17.
Fig. 18.
Inventor
John Alexander Orr
H. J. Sanders
Atty.

Patented Feb. 18, 1941

2,232,261

UNITED STATES PATENT OFFICE 2,232,261

GRASS CUTTER AND TRIMMER

John Alexander Orr, Chicago, Ill.

Application August 25, 1938, Serial No. 226,714

2 Claims. (Cl. 56—255)

This invention relates to grass cutters and trimmers of the electrically operated type. One object is to provide a grass cutter and trimmer that can be used also as an edger; that will cut grass-sown ditches, that will operate upon steep terraces, on bunkers, on the sides of greens as well as flat lawns or rolling ground; that will cut grass growing beside or against stone walls, grave stones, over and about grave markers, etc. without the possibility of damage to the cutting blade and without danger to the operator from contact with moving parts.

A further object is to provide a grass cutter and trimmer constructed to closely follow the ground topography so that the grass may be cut evenly at all points over which the machine may pass. A still further object is to provide a grass cutter and trimmer that may be moved back and forth or toward and away from the operator, as well as laterally back and forth, and obliquely, the machine being capable of efficient operation regardless of the direction in which it is moved.

A further object is to provide a machine of this type having guard means to protect the cutting edges of the rotary blade, guide means for directing the standing grass along the face of walls and the like into the path of the knife and means for permitting the arrest of the rotary blade while permitting rotation of the drive shaft in the event the blade should contact a non-yielding object such as a stone protruding from the ground or that might occasionally be encountered otherwise.

With the foregoing and other objects in view the invention consists in the combination and arrangement of parts to be hereinafter described, pointed out in the claims and illustrated in the drawings, in which—

Fig. 6 is a slightly enlarged vertical cross sectional view taken on the line 6—6 of Fig. 3.

Fig. 7 is a plan view of one form of rotary knife employed.

Fig. 8 is a view of the same knife in side elevation, one of the adjustable and removable blades being shown in an altered position.

Fig. 9 is a plan view of a slightly modified form of knife showing one adjustable feature in two positions.

Fig. 10 is a view of the knife shown in Fig. 9 in side elevation.

Figs. 11 and 12 are plan views of two types of blade guards and grass guides employed.

Fig. 13 is a view in side elevation of the blade guard and grass guide shown in Fig. 15.

Figs. 14 and 15 are top plan views of two slightly different types of blade guards and grass guides that may be employed.

Fig. 16 is an enlarged view, partly in section and partly in elevation, of the lower part of the motor casing showing the motor shaft and the rotary knife with means for attaching same to that shaft.

Fig. 17 is a plan view of a spring washer employed.

Fig. 18 is a central vertical sectional view through a sleeved nut employed.

Like reference characters denote corresponding parts throughout the several views.

Figures 1, 2:
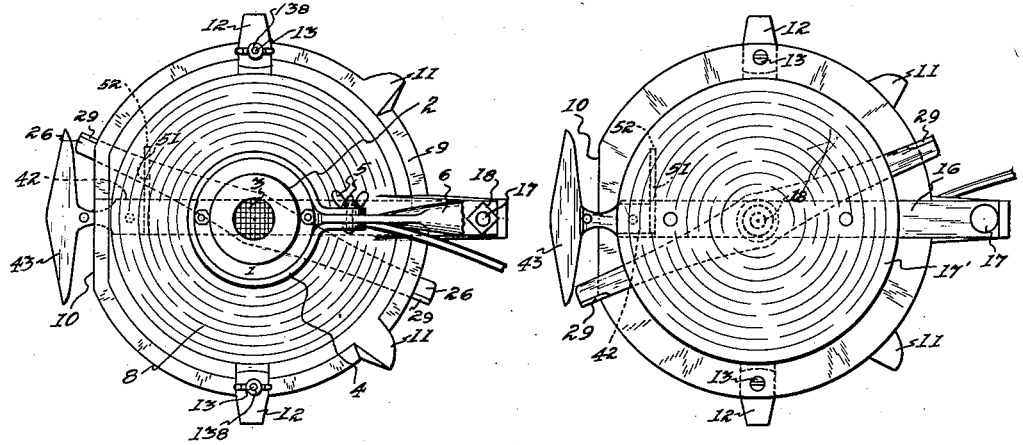
Fig. 1 is a top plan view of the machine.
Fig. 2 is an inverted plan view of the same.

This invention is for a grass cutter and trimmer of the type shown in my co-pending applications, Ser. No. 4,849, for Electric cutters and trimmers; Ser. No. 77,661, for Grass cutters and hedge trimmers; and Ser. No. 181,619, for Grass cutters.

Considerable difficulty has been experienced in providing grass cutters and trimmers of the light weight readily portable electrically operated type with transport means that would enable them to travel over uneven or rolling ground with the same facility as over flat smooth ground, and particularly has this been true when it is desired to perform the cutting operation while the cutter is swung laterally or from side to side or, in fact, when it is moved in any direction other than a forward or backward one.

Rollers, small wheels and other like ground-engaging means are futile and, of course, the machine cannot be swung above the ground if a regular or even cut is to be desired. The present invention having the slide pan or runner with a flat or substantially flat disc-like ground-engaging face or body portion, preferably circular and with an upturned rim or outer edge solves the problem in no uncertain manner. This slide pan moves readily in any and all directions over the ground accommodating itself at all times to the topography of the same. This slide pan need not be exactly round. It will function if it approaches an hexagonal or even an almost triangular shape.

I have not deemed it necessary to illustrate these slight modifications as their construction, when the preferred form is shown, is very readily understandable. This slide pan is disposed beneath and in spaced relation to the lower end of the motor casing and below the rotary knife, the length of which is substantially greater than the diameter of the pan so that the blade may encounter and cut the standing grass before the pan can ride over it and flatten it to the earth or bend it away from the blade. This slide pan is supported by a runner or bracket secured to the motor casing or to the skirt thereof and the pan runner and bracket may be secured to the pan or made integral therewith. The very substantial area of the slide pan permits its movement over the ground without tipping or wobbling.

The reference numeral 1 denotes the motor casing that houses the motor and to the upper end of which casing a cap 2 is secured provided with a dust screen 3 for protection against extraneous matter generally. A metal strap 4 encircles the casing and has secured thereto pivotally by the rivet or bolt and nut 5 the stub handle 6 that is hollow at its outer end to receive an ordinary wooden handle or the like, not shown. The casing 1 is preferably perforated at opposite sides near its lower end and these portions 6a are covered by a perforated plate 7 for ventilation. Secured to or made integral with the lower end of the upper casing is a somewhat bell-shaped skirt 8 that is preferably, though not necessarily, formed with an annular ridge portion 9 that is beveled toward its free edge, the skirt as a whole having a substantially circular periphery except for the straight edge portion 10.

The straight edge portion provides clearance for the cut material in a manner to be hereinafter described. Integral with the skirt and jutting outwardly from the periphery thereof are the two spaced guard teeth 11 and the removable guard teeth 12, two in number, secured thereto by the screw and wing nut 13, 13a. Also extending outwardly from the skirt preferably at a point substantially midway between the teeth 11, 11 and opposite the straight edge 10 is the bracket or arm 14 either integral with said skirt or secured thereto, said bracket having a downturned portion 15 disposed in spaced relation to the skirt periphery at this point and to said bracket portion one end of the runner 16 is secured by the bolt 17 and nut 18, the lower end of the bracket portion 15 terminating below the plane of the periphery of the skirt. From the lower end of the bracket portion 15 the runner 16 extends, at right angles to said bracket portion, transversely of but in spaced relation to the lower free end of the skirt 8, the runner being of greater length than the diameter of the skirt and passing beneath the straight edge portion of the same in a position at right angles thereto.

Secured to or integral with the runner 16 is the slide pan 17' preferably of circular disc shape with an upturned outer edge or rim, said pan being of lesser diameter than said skirt and its center being in a straight line passing through the skirt center at right angles to the plane of the outer edge of the skirt. Extending downwardly from the motor and in line with the slide pan center is the motor shaft 18 externally threaded throughout a considerable part of its lower portion, said shaft terminating slightly above said slide pan. Depending from the lower end of the motor casing and passing through the skirt 8 is the ball housing 19 enclosing a portion of the motor shaft as well as an exteriorly and interiorly threaded collar 20 thereupon which collar is provided at its upper end with the nut 21 that may bear upon the balls 22 thereberneath and about said collar within said housing 19 thus providing a relatively friction free assembly. Immediately beneath the ball housing 19 and upon the motor shaft is a spacer nut 23 and immediately thereberneath and also threaded upon the motor shaft is the nut 24 having the depending sleeve portion 25 that extends freely through the rotary blade 26.

To secure the blade to the sleeve and nut 25, 24 for yielding rotation therewith a spring washer 27 has its hub passed about the end of the motor shaft into free engagement with the lower free end of said sleeve and its winged or outer periphery in engagement with said blade, said washer being retained in said position by the terminal nut 28 upon the free end of the motor shaft. When said nut is screwed down upon said shaft it binds the hub of the spring washer firmly against the lower end of the sleeve thus causing the washer to press quite firmly against the rotary knife and to hold it sufficiently firm to perform the cutting operation. Should this blade, however, encounter some solid or unyielding object such as a stone or like obstruction the blade would cease rotation while the motor shaft could continue to rotate thus avoiding breakage of or serious damage to the blade. By means of the nut 28 the desired pressure or tension is put upon the blade, this pressure or tension, however, being limited in maximum degree by the lower end of the sleeve 25 with which the spring washer contacts.

In operation the knife rotates in a clockwise direction which tends to retain or urge the sleeve nut more firmly upon the motor shaft, the lower end of the spacer nut 23, however, limiting the upper movement of the sleeve nut. This construction provides an assembly that is compact but not unyielding in case of emergency.

Figures 3, 4:
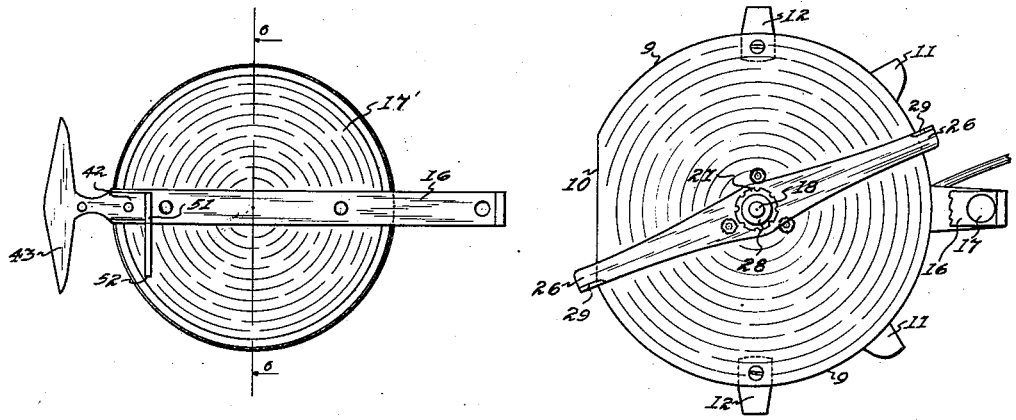
Fig. 3 is a top plan view of the slide or transport pan and the blade guard, the motor housing and other parts being omitted.
Figures 5, 6:
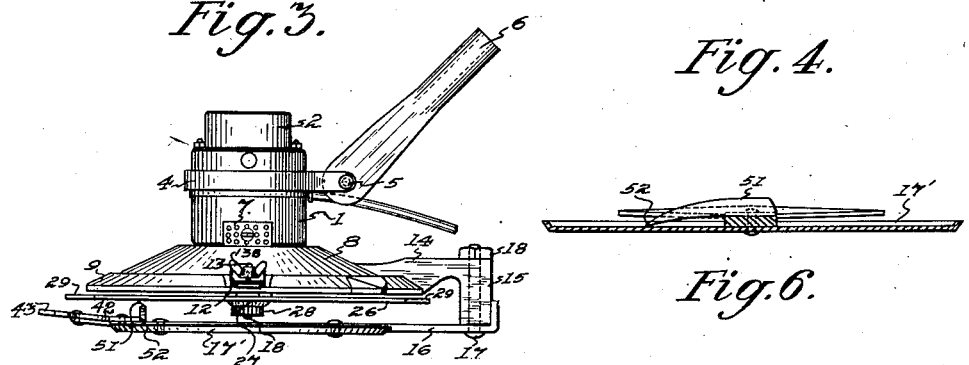
Fig. 6 is an inverted plan view of the machine with the slide pan and blade guard omitted.
Fig. 5 is a view of the grass cutter and trimmer in side elevation.

The knife 26 may be of the construction shown in Figs. 1, 2 and 4 which is a single piece of elongated resilient material having cutting edges 29 formed upon relatively opposite edges of its ends; or as shown in Figs. 7 and 8 the elongated resilient body 30 of the knife may be formed at each end with a sleeve 31 that detachably carries a blade 32 having a head 33. The smaller end of the blade slides through the sleeve 31 into operative position which position is shown in Fig. 7 and at the left in Fig. 8, this blade at the right in Fig. 8 having not been moved to the extended operative position shown at the left. As the knife rotates centrifugal motion causes the outward thrust that moves the heads into engagement with the inner ends of the sleeves and holds the blades in this operative position.

In Figs. 9 and 10 a modified form of knife is shown. The shank or body 34 of the knife is formed at each end with a slot having a wedge shaped portion 35, the larger end opening through the knife end and the smaller end opening into the enlarged somewhat circular inner portion 36, said slot 35, 36 receiving the correspondingly formed shank 37 of the blade 38 formed with the notch 39 that marks the inner end of the edge 40, said blade shank being releasably retained in or secured to the knife by the sliding sleeve 41 movable back and forth covering and uncovering the joint formed by said slot 35, 36 and shank 37, one position of said sleeve, the inoperative position, being shown in full lines at the left, Figs. 9 and 10 and the operative position being shown in dotted lines, Fig. 9. The notched portions 39 act as stops to prevent the sleeves 41 from sliding off the knife body or shank when the knife and blades are assembled. The knife 26 or knives 30 or 34 with their blades in assembly are materially longer than the diameter of the slide pan, slightly longer than any diameter of the skirt but any tooth carried by said skirt extend outwardly a distance slightly beyond an end of the knife as the same is in rotation. A blade guard and grass guide is provided as shown in Fig. 11 and consists of an elongated flat shank 42 and an elongated flat faced crosshead 43 at one end thereof, the ends of said crosshead being pointed, the widest portion of said head being its longitudinal central portion, its faces tapering therefrom to its points, the shank 42 being secured to the forward or free end of the runner 16 or to the slide pan 17 directly opposite the bracket portion 15 in such manner that the knife in rotation will move over the head 43 with the knife or blade end terminating slightly inwardly from the outer periphery of the guard head. The inner edge of the crosshead curves inwardly from its pointed ends toward the shank and protects the ends of the rotating blade even after the ends are worn down materially. This blade protection for new or worn blades against obstructions that may lie in advance of the blade is important; or a blade guard and grass guide as shown in Fig. 12 may be provided and likewise attached to the runner or slide pan and this guard and guide consists of the shank 42', head 43' and upturned straight lip 44 disposed at right angles to and formed along the forward edge of the head and of lesser extent from end to end than said forward edge.

In Figs. 13 and 15 a modified form of blade guard and grass guide is shown which includes an elongated shank 45 having at its forward end an upturned lip 46 at right angles thereto and disposed inwardly therefrom an elongated crossbar 47 having flat faces in the plane of the flat faces of said shank 45 and pointed ends 50, said crossbar being of greater length than said lip 46 and the shank 45 being secured to the runner or slide pan as described with reference to Figs. 11 and 12. In Fig. 14 a further slightly modified form of blade guard and grass guide is shown wherein the shank 45' is provided terminally with a crosshead 46' having pointed ends and a rounded forward edge, and a crossbar 47' spaced inwardly therefrom but of a greater length than said crosshead and with pointed ends, the crosshead, crossbar and shank all being flat and in a common plane, the shank being secured to the runner as in Fig. 15.

In cutting grass along the face of a wall, gravestone or the like the cutter will be moved laterally, the free edge of a crosshead, 43 or 46' or a lip 44 or 46 moved along the face of the wall with the pointed end of the crosshead and sometimes that of the crossbar also in engagement with the wall face. The crossheads, lips and crossbars protect the blade from contact with the face of wall or corner thereof or from contact with a projection that may protrude from the wall face as they are disposed in advance of the ends of the blade. The pointed ends of the crossheads also engage the blades of grass growing against the wall and direct same into the path of the rotating knife to be cut. The slide pan or runner permits this lateral movement of the cutter in one or the other direction along the face of the wall or a back and forth lateral movement may be employed with the pointed ends of the crossheads, crossbars or lips riding against or in very close proximity to the wall face.

Secured to the runner 16 or to the pan 17' contiguous to the inner end of the shank of a blade guard and grass guide is the pick-up spur or bumper 51 extending transversely of the runner or shank, its top edge being rounded, its length being slightly more than twice the width of the runner 16, its width tapering from the inner to the free pointed end 52 which end is disposed toward the on-coming knife as it rotates clockwise.

Should a stone or solid obstruction in any way become lodged between the blade and the skirt 8 and bend the blade downwardly the spur, located inwardly from the blade guard and grass guide, would raise the blade before it could encounter or ride underneath the said guard and guide and so prevent jamming. As the blade of the knife cuts the grass the severed portions will plaster upon and adhere to any parts of the machine against which they may be thrown by the rapidly rotating knife. To provide maximum clearance for this cut material the straight edge portion 10 of the skirt 8 is provided adjacent the blade guard and grass guide and most of this material may clear these parts without hindrance. The only point at which there may be an accumulation of cut material is upon the bracket arm 15, the clear space elsewhere between the rotary knife, skirt and slide pan providing clearance for the escape of this material. There is a certain amount of moisture or sap released when the grass blades are severed in great numbers by the knife and this ordinarily has a tendency to plaster upon and adhere to parts of a cutter in the path thereof unless clearance is provided for this cut material to escape.

What is claimed is:

1. In a grass cutter and trimmer, a motor, a threaded motor shaft, a threaded collar upon said motor shaft, a nut upon said motor shaft abutting said collar, a threaded sleeve integral with said nut and depending therefrom upon said motor shaft, a knife freely receiving said sleeve and abutting said nut, a spring washer having a hub portion receiving said motor shaft and abutting the lower end of said sleeve and a flared peripheral portion engaging said knife, and a terminal nut arranged upon said motor shaft and engaging said spring washer.

2. In a grass cutter and trimmer, a motor, a casing therefor, a skirt at one end of said casing, a motor shaft extending through said casing and skirt and beyond the lower end of the latter, a slide pan disposed below said skirt and motor shaft, a runner extending across said slide pan and therebeyond and secured thereto, a bracket connecting said runner and skirt, a knife operatively secured to said motor shaft between said skirt and slide pan, said knife being of greater length than the width of said skirt and slide pan at any point, a blade guard and grass guide having a flat elongated shank portion secured to one end of said runner and extending outwardly therefrom and a crosshead portion of elongated flat face construction carried by said shank and extending beyond said knife, the ends of said crosshead being pointed.

JOHN ALEXANDER ORR.